US009576020B1

(12) United States Patent
Patterson

(10) Patent No.: US 9,576,020 B1
(45) Date of Patent: Feb. 21, 2017

(54) METHODS, SYSTEMS, AND COMPUTER PROGRAM PRODUCTS FOR STORING GRAPH-ORIENTED DATA ON A COLUMN-ORIENTED DATABASE

(71) Applicant: Socialware, Inc., Austin, TX (US)

(72) Inventor: Justin Patterson, Austin, TX (US)

(73) Assignee: PROOFPOINT, INC., Sunnyvale, CA (US)

( * ) Notice: Subject to any disclaimer, the term of this patent is extended or adjusted under 35 U.S.C. 154(b) by 1018 days.

(21) Appl. No.: 13/655,183

(22) Filed: Oct. 18, 2012

(51) Int. Cl.
*G06F 7/00* (2006.01)
*G06F 17/30* (2006.01)

(52) U.S. Cl.
CPC .............................. *G06F 17/30398* (2013.01)

(58) Field of Classification Search
CPC ................... G06F 17/30398; G06F 17/30277; G06F 17/30286; G06F 21/6245
USPC ......... 707/705, 706, 722, 741, 798, E17.037
See application file for complete search history.

(56) References Cited

U.S. PATENT DOCUMENTS

| | | | |
|---|---|---|---|
| 5,572,650 A | 11/1996 | Antis et al. | |
| 5,819,245 A | 10/1998 | Peterson et al. | |
| 6,029,162 A * | 2/2000 | Schultz | |
| 6,073,110 A | 6/2000 | Rhodes et al. | |
| 6,138,123 A | 10/2000 | Rathbun | |
| 7,269,648 B1 | 9/2007 | Krishnan et al. | |
| 7,493,335 B2 | 2/2009 | Gold et al. | |
| 8,037,108 B1 * | 10/2011 | Chang | 707/803 |
| 8,065,266 B2 | 11/2011 | Hoang et al. | |
| 9,110,947 B1 * | 8/2015 | Watzke | G06F 17/30315 |
| 2002/0120429 A1 | 8/2002 | Ortoleva | |
| 2005/0283754 A1 * | 12/2005 | Vignet | 717/104 |
| 2006/0004851 A1 * | 1/2006 | Gold et al. | 707/103 X |
| 2006/0074857 A1 * | 4/2006 | Etzold et al. | 707/3 |
| 2006/0271528 A1 * | 11/2006 | Gorelik | 707/3 |
| 2008/0162532 A1 | 7/2008 | Daga | |
| 2008/0195643 A1 * | 8/2008 | Sheth-Voss et al. | 707/101 |
| 2009/0222404 A1 * | 9/2009 | Dolin et al. | 707/2 |
| 2010/0185701 A1 | 7/2010 | Ramamurthi et al. | |
| 2010/0250625 A1 * | 9/2010 | Olenick et al. | 707/810 |
| 2010/0274815 A1 * | 10/2010 | Vanasco | 707/798 |
| 2011/0148879 A1 | 6/2011 | Moreno | |

(Continued)

FOREIGN PATENT DOCUMENTS

WO   WO 2010133080 A1   11/2010

*Primary Examiner* — Md. I Uddin
(74) *Attorney, Agent, or Firm* — Sprinkle IP Law Group

(57) ABSTRACT

Systems, methods, and computer program products for efficiently storing and accessing graph-oriented information retrieved from disparate sources using an interface that effectively emulates a graph database to access a set of indexed, column-oriented tables. One embodiment is a system that includes a server and a plurality of storage nodes. The server retrieves graph-oriented social networking data for multiple users, identifies vertices, edges and associated properties within the data and stores this information in key-value lookup tables within a column-oriented database. The server can receive graph-oriented queries, convert the graph-oriented query to corresponding key-value lookup queries, and search the tables of the column-oriented database using the key-value lookup queries. The results of the lookup queries can be converted to a graph-oriented representation and presented to a user.

18 Claims, 3 Drawing Sheets

(56) References Cited

U.S. PATENT DOCUMENTS

| | | | |
|---|---|---|---|
| 2011/0264666 A1* | 10/2011 | Gieseke | 707/741 |
| 2011/0276396 A1* | 11/2011 | Rathod | 705/14.49 |
| 2012/0011432 A1* | 1/2012 | Strutton | 715/234 |
| 2012/0066073 A1* | 3/2012 | Dilip et al. | 705/14.66 |
| 2012/0173820 A1* | 7/2012 | Venkataramani | 711/124 |
| 2013/0013807 A1* | 1/2013 | Chrapko | H04L 41/12 709/238 |
| 2013/0103725 A1* | 4/2013 | Wee | G06F 17/30315 707/812 |
| 2014/0075571 A1* | 3/2014 | Jackson | G06F 17/30292 726/28 |
| 2015/0026158 A1* | 1/2015 | Jin | G06F 17/30979 707/722 |
| 2015/0088844 A1* | 3/2015 | Stigsen | G06F 17/30312 707/703 |

* cited by examiner

METHODS, SYSTEMS, AND COMPUTER PROGRAM PRODUCTS FOR STORING GRAPH-ORIENTED DATA ON A COLUMN-ORIENTED DATABASE

TECHNICAL FIELD

This invention relates generally to social networking sites and, more particularly, to systems, methods, and computer program products for maintaining and accessing graph-oriented data using a graph model overlaid on a column-oriented database.

BACKGROUND

Advances in communications technology often change how people communicate and share information. More recently, social networking sites are providing new ways for users to interact and keep others abreast of their personal and business dealings. The growth of social networking sites is staggering. New sites are emerging daily and new users are joining in droves. Today, social networking sites are being used regularly by millions of people around the globe, and it seems that social networking via websites will continue to be a part of everyday life at least in the United States.

Social networking services offered to users by social networking sites may provide various ways for users to interact and keep others abreast of their personal and business dealings. For example, these services may provide means to stay in touch with friends, communicate with other users, provide information about themselves or their businesses, identify common friends, recommend others' products or services, and so on. These services may be useful to individuals, personally, and to entrepreneurs and businesses that are trying to expand their customer bases.

For some users, there is a great deal of information available through social networking services that may be helpful on both a personal level and on a professional level. The vast amount of information, however, may be difficult to manage and may be as confusing as it is useful. Often, the different services may store duplicate, but possibly inconsistent information (e.g., the same contact may be stored on different services, but each service may have a different phone number stored for the contact). Further, while the different social networking sites may have provide similar services, such as the ability of users to identify friends and business contacts, they also have differences, such as the types or formats of information that may be retained for friends and contacts. These differences may make it difficult to consolidate information from the different services.

In addition to the potential difficulties in managing the information associated with the different social networking services, some businesses may have concerns about the exchange of information between employees, clients, vendors, etc. These concerns may relate to the nature of the activities in which users are engaged, the type of information that is being communicated, the specific information being disclosed, whether malicious or otherwise damaging material is being accessed or allowed onto the business's computers, and so on. Because the information that is the basis of these concerns is distributed across the different social networking sites and is stored in different ways, it may be difficult for a business to examine and audit the information for purposes of determining compliance with the policies of the business.

It would therefore be desirable to provide systems and methods for consolidating the information that is available to users through social networking services and providing means to efficiently store and access the consolidated information, thereby improving the ability of users to make use of the information and improving the ability of businesses to assess compliance with their policies.

SUMMARY

Embodiments disclosed herein systems, methods, and computer readable storage media containing computer instructions for efficiently storing and accessing information retrieved from disparate sources using an interface that effectively emulates a graph database to access a set of indexed, column-oriented tables. The graph model of the interface is well suited to handling the type of graph-oriented data that is typically available from social networking services. The interface identifies the graph elements (nodes and edges) in the data and metadata concerning the relationships between the graph elements, and provides the data to the column-oriented data store in a form that is adapted to the indexed tables of the data store. These tables can be distributed across multiple, physically separate data stores. The interface can then accept graph-oriented queries and provide corresponding sets of column-oriented queries to the column-oriented data store. The column-oriented queries can be efficiently performed, even when the tables of the data store are distributed across multiple servers. The results of the column-oriented queries are evaluated by the interface and returned to the user in a form typical of a graph-oriented database.

One embodiment comprises a system for maintaining and accessing a graph-oriented data set. The system includes a server and a plurality of storage nodes coupled to the server. The server is configured to store social networking data for each of a plurality of users, wherein the data is retrieved from multiple social networking sites. The server may retrieve components of each user's data set from different ones of the social networking sites. For each user, the server stores the corresponding data set on one or more of the storage nodes. The server maintains a graph model of the data set for the user, where the graph model includes a plurality of vertices interconnected by a plurality of edges. For each vertex and each edge in the graph model, one or more corresponding entries are stored in one or more of a plurality of lookup tables in the storage nodes. The server can receive a graph-oriented query, analyze the graph-oriented query and convert the graph-oriented query to one or more corresponding key-value lookup queries. The key-value lookup queries are then used to search the lookup tables and to retrieve the resulting values. The server then presents the results of the lookup table searches to a user. The server may analyze results of the lookup table searches and convert the results to a graph model representation, which is then presented to the user. The lookup tables may be stored on more than one of the storage nodes, which may themselves be physically separate, and the key-value lookup queries corresponding to a single graph-oriented query may be performed on the separate storage nodes.

An alternative embodiment comprises a method for maintaining and accessing a graph-oriented data set. The data may be obtained by accessing a plurality of social networking web sites and retrieving one or more components of the data set from each of the social networking web sites. In this method, a data set for each of a plurality of users is stored on one or more storage nodes. A graph model of the data set is maintained for the user, where the graph model includes a plurality of vertices interconnected by a plurality of edges.

For each vertex and each edge in the graph model, one or more corresponding entries are stored in one or more of a plurality of lookup tables in the storage nodes. The lookup tables may include, for example, a vertex table and an edge table. When a graph-oriented query is received, the graph model query is analyzed and converted to one or more corresponding key-value lookup queries. These generated key-value lookup queries are used to search the lookup tables, which may be stored on more than one of the storage nodes, and may be physically separate. Searching the lookup tables may comprise, for each of the key-value lookup queries, indexing into one of the plurality of lookup tables using a key and retrieving a value associated with the key. The results are then presented to a user. The results of the lookup table searches may be analyzed and converted to a graph-oriented representation, which is then presented to the user.

Another alternative embodiment comprises a computer program product. The computer program product may include at least one non-transitory computer readable storage medium containing program instructions. These instructions are configured to cause a computer system to perform a method including, for example, storing a data set for a user on one or more storage nodes, maintaining a graph model of the data set for the user, receiving a graph-oriented query, analyzing and converting the graph-oriented query to corresponding key-value lookup queries, searching the lookup tables using the generated key-value lookup queries, and presenting the results of the lookup table searches to a user. The program instructions may further cause the computer system to access a plurality of social networking sites and retrieve components of the data set from each of the sites. The components of the data set include vertices that are interconnected by edges, and entries corresponding to these components may be stored in vertex and edge tables that may reside on multiple, possibly physically separate storage nodes. When values are retrieved from the lookup tables, these values may be converted to a graph-oriented representation before being presented to the user.

Other alternative embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

The present systems, methods and products address the problems of the prior art by providing a graph model that is overlaid on a column-oriented data store. The graph model is well suited to management of the type of object oriented data that is available from social networking services (i.e., nodes or vertices that are connected by relationships or edges). The graph model also provides a natural and more intuitive interface to the data than a relational database model. The column-oriented data store provides a means to search and retrieve the data much more rapidly and efficiently than traditional relational database systems, even when the tables of the data store are distributed across multiple servers. The data may include information that identifies associated users, accounts or other information that can be used by the graph model to control access and segregate data for, e.g., privacy purposes.

Figure 1:
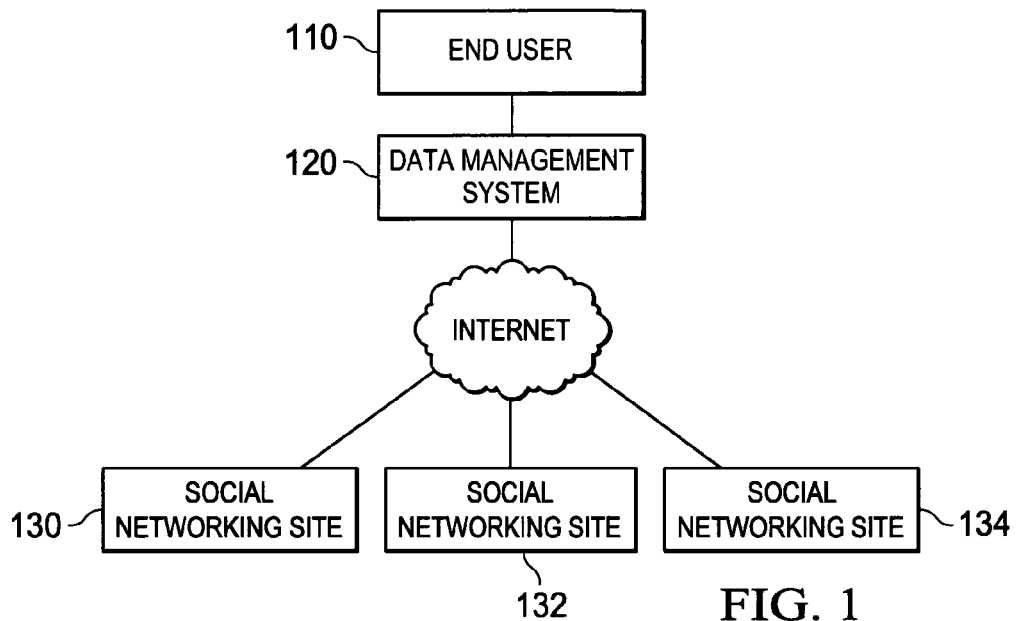
FIG. 1 is a diagram illustrating the high-level topology of an environment in which one embodiment of the present invention is implemented.

FIG. 1 is a diagram illustrating the high-level topology of an environment in which one embodiment of the present invention is implemented. In this embodiment, an end user 110 is coupled to a data management system 120. Data management system 120 is in turn coupled to a plurality of social network sites 130-134. This topology is presented for illustrative purposes, and should not be construed as limiting the possible applications of the present system. For example, in an alternative embodiment, the end user could be coupled to the social networking sites through a proxy server which is also coupled to the data management system. In yet another alternative embodiment, the end user and data management system could each be independently coupled to the social networking sites.

In the example of FIG. 1, data management system 120 is communicatively between end user 110 and social network sites 130-134 to serve as a gateway or intermediary between them. All outgoing requests destined for social network sites 130-134 are routed through data management system 120, which may then forward the requests to social networking sites 130-134. This allows data management system 120 to manage the requests for purposes of analysis, logging, and possible modification. Similarly, data management system 120 may be configured to receive responses communicated from social networking sites 130-134 to end user 110.

In some embodiments, data management system 120 may be implemented as a middleware application between the user applications that are accessed by end user 110 and the applications executing on social networking sites 130-134. The user applications may be executing on a computer system from which end user 110 accesses data management system 120 and social networking sites 130-134. Data management system 120 has no control over these applications, but may be able to monitor the applications as required to achieve the purposes described herein. Data management system 120 may be owned and operated by a company that is independent of end user 110 and social networking sites 130-134.

In some embodiments, data management system 120 may be communicatively coupled to social networking sites 130-134 over a network such as the Internet. Similarly, end user 110 may be communicatively coupled to data management system 120 and/or social networking sites 130-134 over the Internet or another network. End user 110 may have accounts on multiple ones of social networking sites 130-134, and may have a vast amount of data that is available from the social networking sites through these accounts. It may, however, be difficult and/or confusing for the end user to effectively utilize all of the available information. This may be due to a number of reasons, such as the fact that the different social networking sites may provide different services, they may store different information with respect to the nodes and edges, they may store duplicative or conflicting information, they may have different API's that provide different information or provide similar information in different formats, and so on. Data management system 120 is designed to alleviate some of these problems by consolidating all of this information and making it accessible in an easy and efficient manner.

Data management system 120 facilitates the storage and access of the consolidated information from social networking sites 130-134 by overlaying a graph model on a column-oriented database store. The graph model is well suited to the natural graph structure of the social networking data, while the column-oriented data storage enables quick, efficient and scalable access to the data.

Figure 2:
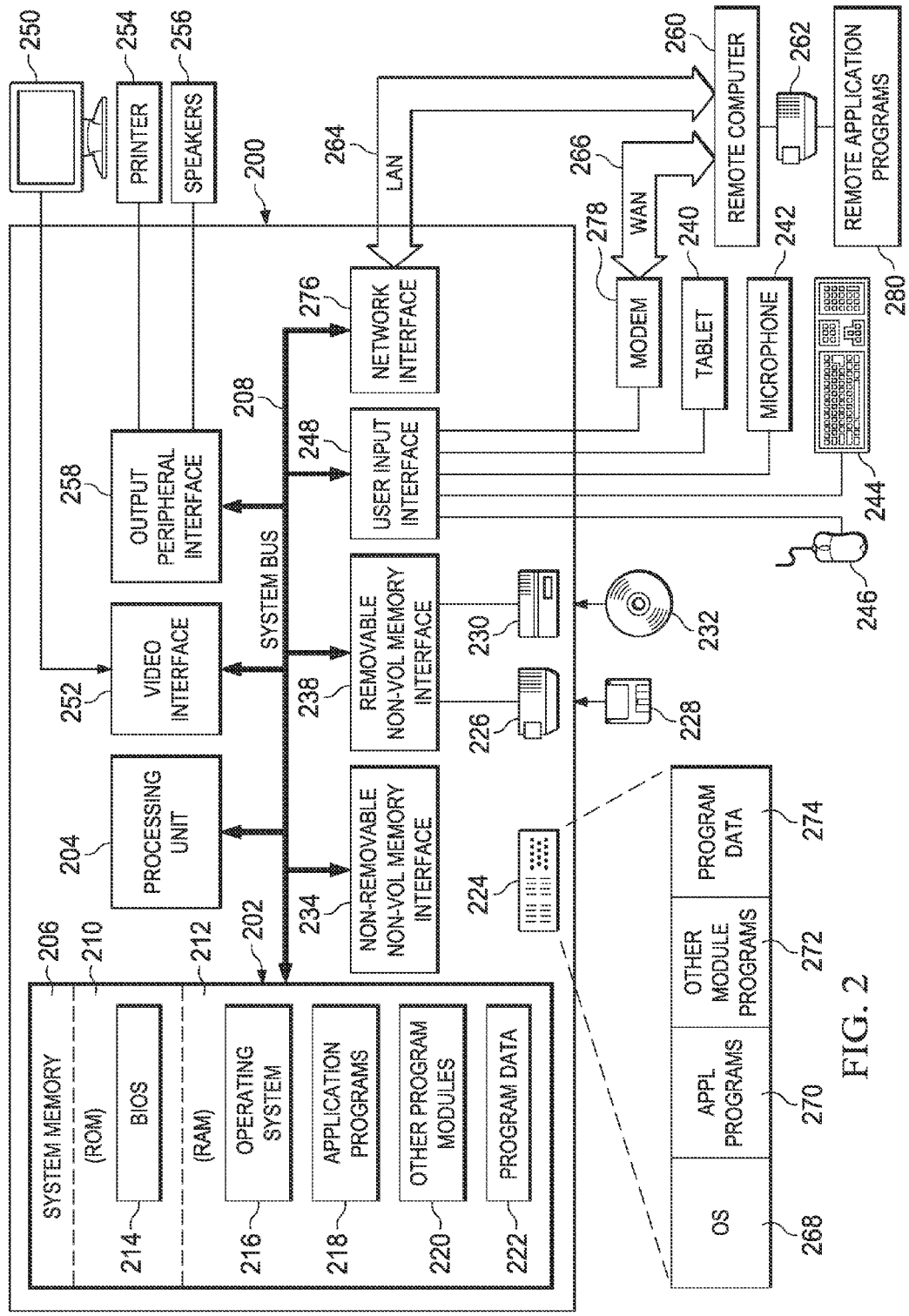
FIG. 2 is a functional block diagram illustrating an exemplary computing system in which embodiments of the present data management system may be implemented.

Before describing the functionality of the data management system, it may be helpful to describe the computing system in which it is implemented. FIG. 2 depicts an exemplary computing system in which embodiments of the data management system disclosed herein may be implemented. Components 202 of computing system 200 may include, but are not limited to, processing unit 204, system memory 206, and system bus 208. System bus 208 may couple various system components including system memory 206 to processing unit 204. System bus 208 may comprise any of several types of bus structures including a memory bus or memory controller, a peripheral bus, and a local bus using any of a variety of bus architectures.

Computing system 200 may include a variety of computer readable storage media. Computer readable storage media can be any available storage media that can be accessed by computing system 200. By way of example, and not of limitation, computer readable storage media may comprise volatile and nonvolatile storage media and removable and non-removable storage media. Computer readable storage media storing computer instructions implementing embodiments disclosed herein may be manufactured by known methods and materials and may rely on known programming languages and techniques for storage of information thereon. Examples of computer readable storage media may include, but are not limited to, random access memory (RAM), read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 200.

In the example shown in FIG. 2, system memory 206 includes ROM 210 and RAM 212. ROM 210 may store basic input/output system 214 (BIOS), containing the basic routines that help to transfer information between elements within computing system 200, such as those used during start-up. RAM 212 may store data and/or program modules that are immediately accessible to and/or presently being operated on by processing unit 204. By way of example, and not of limitation, FIG. 2 shows RAM 212 storing operating system 216, application programs 218, other program modules 220, and program data 222, such as may be necessary to implement the functions of data management system 120.

Computing system 200 may also include other removable/non-removable, volatile/nonvolatile computer readable storage media that can be employed to store computer instructions implementing some embodiments disclosed herein. By way of example only, computing system 200 may include hard disk drive 224, a magnetic disk drive 226, and/or optical disk drive 230. Hard drive 224 may read from and write to non-removable, nonvolatile magnetic media. Disk drive 226 may read from and write to removable, nonvolatile magnetic disk 228. Optical disk drive 230 may read from and write to a removable, nonvolatile optical disk 232 such as a CD ROM or other optical medium. Other removable/non-removable, volatile/nonvolatile computer readable storage media are also possible. As illustrated in FIG. 2, hard drive 224 may be connected to system bus 208 via a non-removable memory interface, such as interface 234, and magnetic disk drive 226 and optical disk drive 230 may be connected to system bus 208 via a removable memory interface, such as interface 238.

The drives and their associated computer readable storage media, discussed above, may provide storage of computer readable instructions, data structures, program modules and other data for computing system 200. For example, hard disk drive 224 may store operating system 268, application programs 270, other program modules 272 and program data 274. Note that these components can either be the same as or different from operating system 216, application programs 218, other program modules 220, and program data 222.

A user may enter commands and information into computing system 200 via input devices such as tablet or electronic digitizer 240, microphone 242, keyboard 244, and pointing device 246. Pointing device 246 may comprise a mouse, a trackball, and/or a touch pad. These and other input devices may be connected to processing unit 204 via user input interface 248. User input interface 248 may be coupled to system bus 208 or via other interface and bus structures, such as a parallel port, a game port, or a universal serial bus (USB).

Monitor or other type of display device 250 may be connected to system bus 208 via an interface, such as a video interface 252. Monitor 250 may also be integrated with a touch-screen panel or the like. Note that the monitor and/or touch screen panel can be physically coupled to a housing in which computing system 200 is incorporated, such as in a tablet-type personal computer. Computing system 200 may comprise additional peripheral output devices such as speakers 256 and printer 254, which may be connected via an output peripheral interface 258 or the like.

Computing system 200 may operate in a networked environment and may have logical connections to one or more remote computers, such as remote computing system 260. Remote computing system 260 may be a personal computer, a server, a router, a network PC, a peer device or other common network node. Although only a memory storage device 262 is shown in FIG. 2, remote computing system 260 may include many or all of the components and features described above with reference to computing system 200.

Logical connections between computing system 200 and remote computing system 260 may include local area network (LAN) 264, connecting through network interface 276, and wide area network (WAN) 266, connecting via modem 278. Additional networks may also be included.

Embodiments disclosed herein can be implemented to run on various platforms and operating systems. The functionality disclosed herein may be embodied directly in hardware, in a software module executed by a processor or in any combination of the two. Furthermore, software operations may be executed, in part or wholly, by one or more servers on a client's system, via hardware, software module or any combination of the two. A software module (program or executable) may reside on one or more computer readable storage media described above. In FIG. 2, an exemplary storage medium is coupled to the processor such that the processor can read information from, and write information to, the storage medium. In the alternative, the storage medium may be integral to the processor. The processor and the storage medium may also reside in an application specific integrated circuit (ASIC).

As noted above, social networking sites provide services that facilitate building or tracking relationships among users, including individuals, businesses and other entities. These users may, for example, share relationships, interests, activities, backgrounds, etc. Social networking sites store information corresponding to the users, their relationships, and other related information, and provide services that may allow users to share and search share ideas, activities, events, interests, and otherwise interact with each other.

Because social networking sites are focused on the relationships between users, the information that is maintained by these sites naturally has a graph structure. In other words, the information consists of entities and relationships that can be represented by nodes (or vertices) and edges, respectively in a graph. The entities represented by the nodes may include individuals, groups, businesses, accounts, schools, cities, institutions, or other types of entities. The edges may represent relationships such as friendships, family relationships, employer-employee relationships, or other types of relationships. Each node and each edge may have associated characteristics or information. For example, an individual may have an associated birthdate, hometown, marital status, etc. A relationship may also have information associated with it, such as a start date, a last contact date, etc.

Data management system 120 is designed to retrieve all of the information from social networking sites 130-134 that is relevant to end user 110, and to enable the end user to search and otherwise make use of this information. In fact, the system is designed to do this for a large number of different end users. (The system may also be used, for example, by third parties such as employers to regulate compliance matters involving their employees.) The consolidation of this information results in several problems that are not adequately addressed by prior art systems. For instance, because the social networking sites are different, and have different services, information content, formats, etc. the information that is retrieved from each social networking sites is typically inconsistent in various ways from the other social networking sites. Consequently, the information retrieved from the different social networking sites is not easily combined into a conventional relational database, which typically has a very well defined, formalized structure and is therefore relatively inflexible. If a conventional relational database schema were to be adapted to accommodate the many differences of the various social networking sites, it would be quite large and inefficient.

Another problem is that a conventional relational database is not well suited for queries of the type that are often used to search social networking data. For example, it may be desirable to search for all of the friends of a particular user, or to search for people who are related to a particular person by multiple degrees (e.g., a friend of a friend). In order to execute such queries using a relational database, it is necessary to perform one or more joins of entire tables within the database to create another, larger table from which the results of the queries may be determined. Most of this resulting table contains unused information. In the case of a query to identify all of a particular user's friends, it might be necessary to join a table identifying each user to a table identifying friend relationships, and then join this again to the table identifying each user. As mentioned above, the resulting table can be tremendously large. This same query can be executed in a graph database, on the other hand, by identifying the node for the user of interest and following the edges that define friend relationships to identify the specific nodes corresponding to the friends of the user. This process is much more efficient than that of the relational database query. This advantage of the graph database over the relational database increases as additional edges must be traversed (e.g., when it is desired to find the friends of a user's friends).

Still another problem relates to the quantity of data that must be stored by the data management system. As noted above, the amount of data that is retrieved from the various social networking sites for many the many users that are supported by the data management system is very large. Conventional relational databases may be able to store data across multiple servers, but they have the inefficiencies discussed above. Further, it is typically the case that distributed relational databases are actually split into different databases, each of which is maintained on a different server. While there are graph databases that are commercially available and that overcome some of the problems associated with relational databases, these graph databases typically operate on a single server, rather than multiple servers.

The present data management system addresses these problems by overlaying a graph model on a column-oriented data storage system. The graph model provides the advantages of the graph database (e.g., efficient execution of queries), while the column-oriented data storage allows the data to be distributed across multiple servers without negatively impacting performance. The graph model can also implement access controls to segment data into sub-graphs, based on data stored in the column-oriented data storage.

Figure 3:
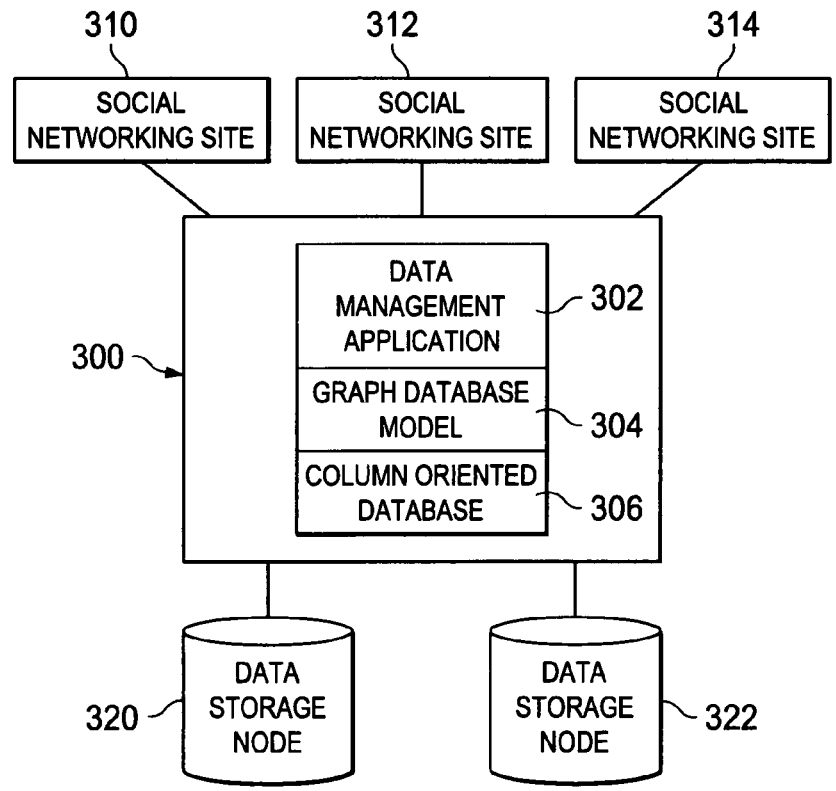
FIG. 3 is a functional block diagram illustrating the structure of the data management system in one embodiment.

Referring to FIG. 3, a functional block diagram illustrating the structure of the data management system in one embodiment is shown. In this embodiment, data management system 300 includes a data management application 302, a graph database model 304 and a column-oriented database 306. Data management system 300 is coupled to one or more data storage devices (e.g., 320, 322).

Data management application 302 is configured to interact with social networking sites 310, 312 and 314. For instance, data management application 302 may perform tasks that retrieve data from social networking sites 310-314. In one embodiment, this data includes all of the information associated with a set of users for whom data management system 300 manages social networking data ("subscribed users"). These subscribed users may include individuals who are end users of the system, or they may be associated with entities (e.g., businesses) that are users of the system. The data includes vertices and edges that correspond to the entities and relationships associated with each of the users.

As the data is retrieved from social networking sites 310-314, data management application 302 accesses graph model 304 and provides the retrieved social networking data to the graph model. The graph model identifies the vertices and edges defined by the data, as well as the properties, characteristics or other information associated with the vertices and edges. While a graph database normally stores each element with a direct pointer to its adjacent elements so that no index lookups are performed, graph model 304 works cooperatively with column-oriented database 306 to store the elements in indexed tables within the column-oriented data stores (e.g., 320, 322). In this manner, data management system 300 retrieves all of the graph-oriented social networking information from social networking sites 310-314 that is associated with the subscribed users, and stores this information in lookup tables that can be maintained on multiple data storage units (e.g., 320, 322). This provides scalability that enables the capacity of data management system 300 to incrementally expand to handle increasing numbers of users and increasing amounts of data by adding servers rather than providing a single, increasingly large server.

In one embodiment, the data that is retrieved from a social networking site is stored with information that identifies the specific user account for which the data was retrieved. In this embodiment, the user account information identifies the associated social networking site. For instance, the identifier "fb:12345" may be used to identify Facebook account 12345. The data is also stored with information that identifies a particular customer with which the data is associated. For instance, the identifier "c1" may be used to identify Customer 1. The user account, site and customer information allow the system to control access to the data so that it can be segmented into sub-parts (or sub-graphs) that are appropriate for viewing and/or use by particular users. For example, the system can allow an administrator for a business to access only data that is associated with users who are employed by that business.

When it is desired to access the information maintained by data management system 300, graph model 304 allows a user to query the data in the same manner as a graph database. For instance, a first user may wish to find all of the users who have commented on posts that are made in groups administered by the first user. The first user generates a graph-oriented query for this information and submits the query to graph model 304. Graph model 304 interprets the query and converts the graph-oriented query to a set of column-oriented queries which may also be referred to as key-value lookup queries, or key-value lookups. For example, the column-oriented queries could include lookups of the groups administered by the first user, lookups of the posts made in these groups, and lookups of users who are associated with these posts. The key-value lookups are not necessarily generated concurrently, but may be constructed sequentially (e.g., the lookups of posts may be constructed after the lookups of the groups have been performed).

The key-value lookups generated by graph model 304 are used to index into the tables stored on the data stores (e.g., 320, 322) and retrieve the values associated with the keys. The key-value lookups may also include qualifiers that restrict access to appropriate portions of the data in the data stores. For example, the qualifiers may specify that only a particular user's information is to be retrieved. The key-value lookups can be efficiently performed on tables that are distributed across multiple data storage units (e.g., 320, 322). By contrast, conventional graph databases typically do not operate on data stored on multiple servers. A conventional relational database could access data on multiple servers, but would require multiple joins to create a resulting table that contains all of the information in the joined tables, rather than only the specific information responsive to the query, so it would be much less efficient than the present system.

Figure 4:
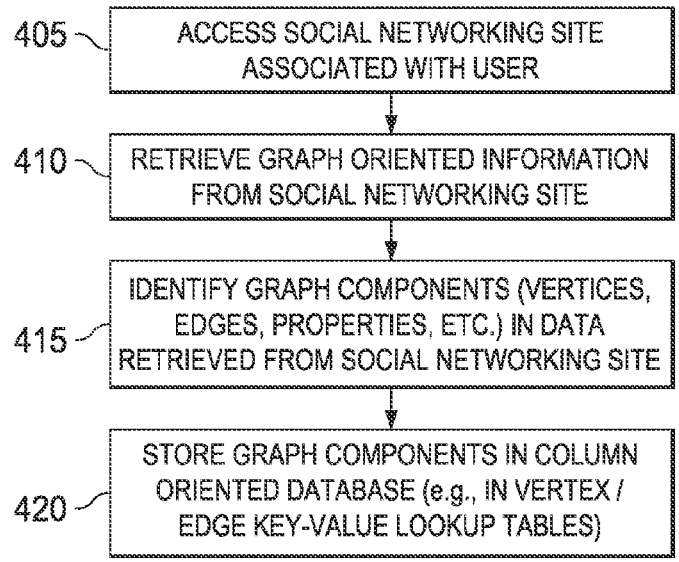
FIG. 4 is a flow diagram illustrating an exemplary method for retrieving social networking information and storing this information in a data management system.
Figure 5:
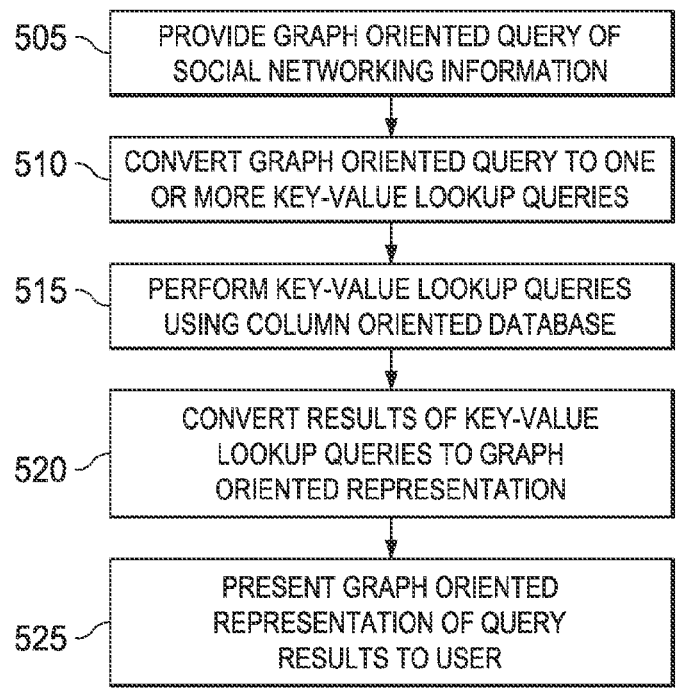
FIG. 5 is a flow diagram illustrating an exemplary method for accessing the social networking information stored by the data management system.

The various embodiments of the invention include methods for maintaining and utilizing social networking information. Exemplary methods are shown in FIGS. 4 and 5. FIG. 4 illustrates an exemplary method for retrieving social networking information and storing this information in a data management system. FIG. 5 illustrates an exemplary method for accessing the social networking information stored by the data management system.

Referring to FIG. 4, a flow diagram illustrating a method for obtaining and storing social networking information in accordance with one embodiment is shown. As noted above, there may be many users who are subscribed to the present data management system. The system is designed to obtain a complete set of the social networking information associated with each user. This complete set of information may include, for each user, information that is maintained on one or more different social networking sites. The method of FIG. 4 depicts a process that may be repeated for the different users and the different social networking sites. Further, the process may access and store the available information for a particular user and particular social networking site incrementally. In other words, the process of FIG. 4 may be repeated a number of times to obtain and store all of the available data for that particular user and social networking site.

As shown in FIG. 4, the data management system first accesses one of the social networking sites on which a user has an account (405). Typically, the user will authorize the data management system to access the user's account, so the data management system will be able to retrieve any of the data that is accessible by the user. In one embodiment, the data management system is configured to access the social networking site via API's that are provided by the social networking site. These API's may include API's that are designed to enable access to greater amounts of data than typical user requests (e.g., browser requests). Accessing the data via the API's may therefore be more efficient than typical user accesses. In an alternative embodiment, the data management system may be configured to request information from the social networking site in the same manner as the user. In yet another alternative embodiment, the data management system may be configured to snoop on communications between the user and the social networking site and thereby obtain data that is accessed by the user.

In response to the data management system's request, the social networking site provides data associated with the user, which is retrieved or received by the data management system (410). The received data is examined by the data management system to identify graph elements in the data (415). As explained above, these graph elements may include vertices (or nodes) representative of things such as users, businesses, groups and the like. The graph elements may also include edges between the vertices which are representative of the relationships between the users, businesses, etc. The data management system may also obtain information from the social networking site as to the properties, characteristics or other information associated with the vertices and edges.

After the data management system has identified the graph elements in the retrieved data, these elements are stored in a column-oriented database (420). In one embodiment, an open source database such as Cassandra may be used. Cassandra uses what are referred to as "column families". Each entry (or "row") in a Cassandra database has a key that may be associated with multiple values, and can be used as a key-value table. Each of the values is associated with a particular column, but it is not necessary that each entry have a value associated with every column. It should also be noted that the column families of Cassandra do not define a particular schema for the data, as required in a relational database, and therefore provide flexibility that is needed when consolidating data from several different social networking sites. The column-oriented database may include, for example, a vertex key-value table and an edge key-value table. Vertices that are identified in the social networking data (e.g., users, groups, businesses, etc.) are stored in the vertex key-value table, while edges in the data (e.g., friend relationships, family relationships, business relationships, etc.) are stored in the edge table. As noted above, the tables of the column-oriented database may be distributed across multiple servers, so the system is horizontally scalable.

Each of the vertex and edge tables is a key-value lookup table (which may alternatively be referred to by terms such as "hash table", "map", "dictionary" or the like). In the vertex table, the key is an identifier associated with the vertex, and the value is a set of information that is associated with the vertex. Similarly, in the edge table, the key is an identifier associated with the edge, and the value is a set of information that is associated with the edge. Each table may be a common store for data that originated from multiple, different social networking sites. Because the same entity may be represented in each of the different social networking sites, there may be multiple entries in the tables that represent the same vertex or edge. In one embodiment, it is necessary to retain these different entries in order to prevent comingling of different details that may be associated with the different entries.

As noted above, the data stored in the column-oriented database may be associated with information identifying an associated customer, user account, etc., for access control purposes. In one embodiment that uses Cassandra, column families are included for a customer identifier and a user account identifier. When data is retrieved from a particular social networking site, it is retrieved for a particular customer on behalf of a particular user account. The identifiers for the customer and user account are stored with each entry of this data in the Cassandra database (where each entry is associated with a corresponding vertex or edge). In this embodiment, the customer and user account identifiers are also indexed, so that these identifiers can be easily used to restrict subsequent queries, as will be explained in more detail below.

After the social networking data is stored, the data can be searched and retrieved from the column-oriented database. An exemplary method for doing so is illustrated in the flow diagram of FIG. 5. Because the data management system provides a graph model overlaid on the column-oriented database, the system is accessed using a graph-oriented query (505). The system can be accessed by users, including applications such as data management application 302. The graph model is configured to convert the graph-oriented query into a corresponding set of key-value lookups (510). These key-value lookups are suitable for accessing the tables of the column-oriented database in which the social networking data is stored. The graph model then passes the key-value lookups to the column-oriented database to be executed (515). When the results of the queries have been received by the graph model, the graph model interprets the results of the key-value lookups and produces a graph-oriented response to the original graph-oriented query (520). This result is then presented to the user or application in response to the original query (525).

It should be noted that the set of key-value lookups that are necessary to implement the original graph-oriented query may need to be executed sequentially. Further, some of the key-value lookups may not be determinable until others have been executed. For example, if it is desired to determine the posts that have been made by a user's friends, it would be necessary to first generate and perform key-value lookups to identify the user's friends. Then, the identities of the friends could be used to generate key-value lookups for the posts made by these friends. These key-value lookups would then be performed to retrieve the desired information. The graph model may use all of the retrieved information (e.g., the identities of the friends and the posts) or only a portion of the retrieved information (e.g., the posts) when converting the information to a graph-oriented response to the original query.

In one of the examples above, a Cassandra database is used to store the column-oriented data, as well as associated customer and user account identifiers. In this embodiment, when a user submits a graph-oriented query to the graph model, information identifying the user's authorization to access portions of the data is also made available to the graph model. For instance, if the user is an administrator for Customer 1, he or she may be authorized to access all information associated with that particular customer. When the graph model converts the received graph-oriented query to the corresponding set of column-oriented queries, the graph model automatically includes the restriction that the query results must include the identifier for Customer 1. The results of the queries are then converted into a graph-oriented representation that includes only data associated with Customer 1.

In this manner, the system dynamically segments the stored social networking data into sub-graphs that include information that the user is authorized to access, but exclude information that the user is not authorized to access. Different users that are authorized to access different portions of the stored data may therefore be presented with different results in response to submitting identical graph-oriented queries to the graph model. The segmentation (the restriction of the data to portions authorized for the particular user) is performed automatically by the graph model and is transparent to the user.

Software implementing embodiments disclosed herein may be implemented in suitable computer-executable instructions that may reside on a computer-readable storage medium. The computer-executable instructions may a computer system to perform methods such as are described above. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Those skilled in the art of the invention will recognize that the disclosed embodiments have relevance to a wide variety of areas in addition to the specific examples described above. For example, although the examples above are described in the context of data obtained from social networking sites, some embodiments disclosed herein can be adapted or otherwise implemented to work in other types of environments, circumstances, etc. where it is desirable to provide maintain and easily and rapidly access large amounts of graph-oriented data. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A system for maintaining and accessing a graph-oriented data set over a network, the system comprising:
    a server communicatively connected to the network; and
    a plurality of column-oriented storage nodes coupled to the server via the network;
    wherein the server is configured to, for each user of a plurality of users:
        store social networking data associated with the each user on one or more of the plurality of column-oriented storage nodes,
        maintain a graph model of the social networking data associated with the each user,
            wherein the graph model identifies a plurality of vertices and a plurality of edges defined by the social networking data associated with the each user,
            wherein the graph model works cooperatively with a column-oriented database to store, for each vertex and each edge in the graph model, one or more corresponding entries in one or more of a plurality of lookup tables in the plurality of column-oriented storage nodes,
            the column-oriented database comprising a vertex key-value table and an edge key-value table,
            the vertex key-value table configured for storing entities identified in the social networking data associated with the each user,
            the edge key-value table configured for storing relationships identified in the social networking data associated with the each user,
        receive a graph-oriented query via a user input interface on a computing device communicatively connected to the server via the network,
        analyze the graph-oriented query and sequentially convert the graph-oriented query to one or more column-oriented key-value lookup queries,
        search the plurality of lookup tables distributed across the plurality of column-oriented storage nodes by performing the column-oriented key-value lookup queries corresponding to the graph-oriented query on the plurality of column-oriented storage nodes, wherein the plurality of column-oriented storage nodes are physically separate storage nodes, and
        convert results from the search to a graph model representation and present on the computing device to a user via the network.

2. The system of claim 1, wherein the server is configured to analyze the results from searching the plurality of lookup tables distributed across the plurality of column-oriented storage nodes.

3. The system of claim 1, wherein the server is configured to search the plurality of lookup tables distributed across the plurality of column-oriented storage nodes in response to receiving the graph-oriented query.

4. The system of claim 1, wherein the column-oriented key-value lookup queries are restricted by one or more identifiers associated with a user that submits the graph-oriented query to the server and wherein the results from the search include only entries that are associated with the one or more identifiers associated with the user.

5. The system of claim 1, wherein each of the entries is stored with a customer identifier and a user account identifier.

6. The system of claim 1, wherein the server is configured to access a plurality of social networking web sites and to retrieve one or more components of the social networking data from each of the social networking web sites, wherein for each component of the one or more components of the social networking data, the server identifies corresponding vertices and edges in the each component, and stores the identified vertices and edges in one or more of the plurality of lookup tables.

7. The system of claim 1, wherein the server is configured to search the one or more of the plurality of lookup tables by performing at least a first one of the column-oriented key-value lookup queries on a first one of the plurality of lookup tables which is stored on a first one of the plurality of column-oriented storage nodes and performing at least a second one of the column-oriented key-value lookup queries on a second one of the plurality of lookup tables which is stored on a second one of the plurality of column-oriented storage nodes.

8. A method for maintaining and accessing a graph-oriented data set over a network, the method comprising:
   storing, by a server computer communicatively connected to the network, social networking data associated with a user on one or more column-oriented storage nodes coupled to the server via the network;
   maintaining, by the server computer, a graph model of the social networking data associated with the user,
      wherein the graph model identifies a plurality of vertices and a plurality of edges defined by the social networking data associated with the user,
      wherein the graph model works cooperatively with a column-oriented database to store, for each vertex and each edge in the graph model, one or more corresponding entries in one or more of a plurality of lookup tables in the column-oriented storage nodes, the column-oriented database comprising a vertex key-value table and an edge key-value table,
      the vertex key-value table configured for storing entities identified in the social networking data associated with the each user,
      the edge key-value table configured for storing relationships identified in the social networking data associated with the each user;
   receiving, by the server computer, a graph-oriented query via a user input interface on a computing device communicatively connected to the server computer via the network;
   analyzing, by the server computer, the graph-oriented query and sequentially converting, by the server computer, the graph-oriented query to one or more column-oriented key-value lookup queries;
   searching, by the server computer, the plurality of lookup tables distributed across the column-oriented storage nodes by performing the column-oriented key-value lookup queries corresponding to the graph-oriented query on the plurality of column-oriented storage nodes, wherein the column-oriented storage nodes are physically separate storage nodes; and
   converting, by the server computer, results from the search to a graph model representation and presenting on the computing device to a user via the network.

9. The method of claim 8, further comprising analyzing the results from searching the plurality of lookup tables distributed across the column-oriented storage nodes.

10. The method of claim 8, further comprising restricting the column-oriented key-value lookup queries to entries that are associated with one or more identifiers associated with a user that submits the graph-oriented query to the server computer.

11. The method of claim 8, wherein each of the entries is stored with a customer identifier and a user account identifier.

12. The method of claim 8, further comprising accessing a plurality of social networking web sites and retrieving one or more components of the social networking data from each of the social networking web sites, wherein for each component of the one or more components of the social networking data, the server computer identifies corresponding vertices and edges in the each component, and stores the identified vertices and edges in one or more of the plurality of lookup tables.

13. The method of claim 8, wherein searching the plurality of lookup tables comprises performing at least a first one of the column-oriented key-value lookup queries on a first one of the plurality of lookup tables which is stored on a first one of the column-oriented storage nodes and performing at least a second one of the column-oriented key-value lookup queries on a second one of the plurality of lookup tables which is stored on a second, physically separate one of the column-oriented storage nodes.

14. A computer program product comprising at least one non-transitory computer readable storage medium containing computer instructions configured to cause a computer system to perform:
   storing social networking data associated with a user on one or more column-oriented storage nodes, the storage nodes communicatively coupled to the computer system via the network;
   maintaining a graph model of the social networking data associated with the user,
      wherein the graph model identifies a plurality of vertices and a plurality of edges defined by the social networking data associated with the user,
      wherein the graph model works cooperatively with a column-oriented database to store, for each vertex and each edge in the graph model, one or more corresponding entries in one or more of a plurality of lookup tables in the column-oriented storage nodes, the column-oriented database comprising a vertex key-value table and an edge key-value table,
      the vertex key-value table configured for storing entities identified in the social networking data associated with the each user,
      the edge key-value table configured for storing relationships identified in the social networking data associated with the each user;
   receiving a graph-oriented query via a user input interface on a computing device communicatively connected to the computer system via the network;
   analyzing the graph-oriented query and sequentially converting the graph-oriented query to one or more column-oriented key-value lookup queries;
   searching the plurality of lookup tables distributed across the column-oriented storage nodes by performing the column-oriented key-value lookup queries corresponding to the graph-oriented query on the plurality of column-oriented storage nodes, wherein the column-oriented storage nodes are physically separate storage nodes; and
   converting results from the search to a graph model representation and presenting on the computing device to a user via the network.

15. The computer program product of claim 14, wherein the computer instructions further cause the computer system to perform:
   analyzing the results from searching the plurality of lookup tables distributed across the column-oriented storage nodes.

16. The computer program product of claim 14, wherein the computer instructions further cause the computer system to perform:
   accessing a plurality of social networking web sites and retrieving one or more components of the social networking data from each of the social networking web sites, wherein for each component of the one or more components of the social networking data, the computer system identifies corresponding vertices and edges in the each component, and stores the identified vertices and edges in one or more of the plurality of lookup tables.

17. The computer program product of claim 14, wherein searching the plurality of lookup tables comprises performing at least a first one of the column-oriented key-value lookup queries on a first one of the plurality of lookup tables which is stored on a first one of the column-oriented storage nodes and performing at least a second one of the column-oriented key-value lookup queries on a second one of the plurality of lookup tables which is stored on a second, physically separate one of the column-oriented storage nodes.

18. The computer program product of claim 14, wherein the computer instructions further cause the computer system to perform:

restricting the column-oriented key-value lookup queries to entries that are associated with one or more identifiers associated with a user that submits the graph-oriented query to the computer system.

\* \* \* \* \*